(12) United States Patent
Bakis et al.

(10) Patent No.: US 6,859,778 B1
(45) Date of Patent: Feb. 22, 2005

(54) METHOD AND APPARATUS FOR TRANSLATING NATURAL-LANGUAGE SPEECH USING MULTIPLE OUTPUT PHRASES

(75) Inventors: Raimo Bakis, Briarcliff Manor, NY (US); Mark Edward Epstein, Katonah, NY (US); William Stuart Meisel, Tarzana, CA (US); Miroslav Novak, Mohegan Lake, NY (US); Michael Picheny, White Plains, NY (US); Ridley M. Whitaker, Katonah, NY (US)

(73) Assignees: International Business Machines Corporation, Armonk, NY (US); OIPENN, Inc., New York, NY (US)

( * ) Notice: Subject to any disclaimer, the term of this patent is extended or adjusted under 35 U.S.C. 154(b) by 0 days.

(21) Appl. No.: 09/526,985

(22) Filed: Mar. 16, 2000

(51) Int. Cl.[7] .............................................. G10L 21/00
(52) U.S. Cl. ................................ 704/277; 704/2; 704/8
(58) Field of Search ................................ 704/2, 3, 4, 8, 704/9, 231, 235, 256, 266, 270, 277

(56) References Cited

U.S. PATENT DOCUMENTS 6,556,972 B1 * 4/2003 Bakis et al. ................ 704/277

* cited by examiner

*Primary Examiner*—Susan McFadden
(74) *Attorney, Agent, or Firm*—Ryan, Mason & Lewis, LLP; Thu Ann Dang, Esq.

(57) ABSTRACT

A multi-lingual translation system that provides multiple output sentences for a given word or phrase. Each output sentence for a given word or phrase reflects, for example, a different emotional emphasis, dialect, accents, loudness or rates of speech. A given output sentence could be selected automatically, or manually as desired, to create a desired effect. For example, the same output sentence for a given word or phrase can be recorded three times, to selectively reflect excitement, sadness or fear. The multi-lingual translation system includes a phrase-spotting mechanism, a translation mechanism, a speech output mechanism and optionally, a language understanding mechanism or an event measuring mechanism or both. The phrase-spotting mechanism identifies a spoken phrase from a restricted domain of phrases. The language understanding mechanism, if present, maps the identified phrase onto a small set of formal phrases. The translation mechanism maps the formal phrase onto a well-formed phrase in one or more target languages. The speech output mechanism produces high-quality output speech. The speech output may be time synchronized to the spoken phrase using the output of the event measuring mechanism.

35 Claims, 6 Drawing Sheets

FIG. 3
TRANSLATION TABLE 300

| PREDEFINED WORD/PHRASE (SOURCE LANGUAGE) 330 | TRANSLATION– TARGET LANGUAGE 1 350 | ... | TRANSLATION– TARGET LANGUAGE N 360 |
|---|---|---|---|
| THE DOW JONES AVERAGE ROSE TODAY (305) | Le Dow Jones est monté aujourd'hui | ... | Dow Jones prumer se zvedl |
| THE NASDAQ FELL IN HEAVY TRADING (310) | Le NASDAQ a baissé au cours d'une séance active | ... | NASDAQ klesl behem silneho obchodovani |
| ... (315) | ... | ... | ... |
| THE NEW YORK STOCK EXCHANGE SUSPENDED TRADING (320) | Le New York Stock Exchange a suspendu les quotations | ... | Newyorska burza zastavila obchodovani |

TEMPLATE-BASED TRANSLATION TABLE
500

| PREDEFINED WORD/PHRASE (SOURCE LANGUAGE) 530 | TRANSLATION- TARGET LANGUAGE 1 550 | ... | TRANSLATION- TARGET LANGUAGE N 560 |
|---|---|---|---|
| THE DOW JONES AVERAGE ROSE 150 POINTS IN HEAVY TRADING (505) | Le Dow Jones a gagné <number> points lors d'une séance particulièrement active | ... | Dow Jones prumer vcera vzrostl o <number> bodu behem silneho obchodovani |
| THE NASDAQ FELL 29 POINTS (510) | Le NASDAQ a perdu <number> points | ... | NASDAQ klesl o <number> bodu |
| ... (515) | ... | ... | ... |
| THE HANSANG INDEX FELL 3% YESTERDAY (520) | Le Hansang a perdu <percent> hier | ... | Hansang index klesl o <percent> |

FIG. 6

METHOD AND APPARATUS FOR TRANSLATING NATURAL-LANGUAGE SPEECH USING MULTIPLE OUTPUT PHRASES

FIELD OF THE INVENTION

The present invention relates generally to speech-to-speech translation systems and, more particularly, to methods and apparatus that perform automated speech translation.

BACKGROUND OF THE INVENTION

Speech recognition techniques translate an acoustic signal into a computer-readable format. Speech recognition systems have been used for various applications, including data entry applications that allow a user to dictate desired information to a computer device, security applications that restrict access to a particular device or secure facility, and speech-to-speech translation applications, where a spoken phrase is translated from a source language into one or more target languages. In a speech-to-speech translation application, the speech recognition system translates the acoustic signal into a computer-readable format, and a machine translator reproduces the spoken phrase in the desired language.

Multilingual speech-to-speech translation has typically required the participation of a human translator to translate a conversation from a source language into one or more target languages. For example, telephone service providers, such as AT&T Corporation, often provide human operators that perform language translation services. With the advances in the underlying speech recognition technology, however, automated speech-to-speech translation may now be performed without requiring a human translator. Automated multilingual speech-to-speech translation systems will provide multilingual speech recognition for interactions between individuals and computer devices. In addition, such automated multilingual speech-to-speech translation systems can also provide translation services for conversations between two individuals.

A number of systems have been proposed or suggested that attempt to perform speech-to-speech translation. For example, Alex Waibel, "Interactive Translation of Conversational Speech", Computer, 29(7), 41–48 (1996), hereinafter referred to as the "Janus II System," discloses a computer-aided speech translation system. The Janus II speech translation system operates on spontaneous conversational speech between humans. While the Janus II System performs effectively for a number of applications, it suffers from a number of limitations, which if overcome, could greatly expand the accuracy and efficiency of such speech-to-speech translation systems. For example, the Janus II System does not synchronize the original source language speech and the translated target language speech.

A need therefore exists for improved methods and apparatus that perform automated speech translation. A further need exists for methods and apparatus for synchronizing the original source language speech and the translated target language speech in a speech-to-speech translation system. Yet another need exists for speech-to-speech translation methods and apparatus that automatically translate the original source language speech into a number of desired target languages.

SUMMARY OF THE INVENTION

Generally, the present invention provides a multi-lingual translation system. The present invention provides multiple output sentences for a given word or phrase. Each output sentence for a given word or phrase reflects, for example, a different emotional emphasis, dialect, accents, loudness, pitch or rates of speech. A given output sentence could be selected automatically, or manually as desired, to create a desired effect. For example, the same output sentence for a given word or phrase can be recorded three times, to selectively reflect excitement, sadness or fear.

Changes in the volume or pitch of speech can be utilized, for example, to indicate a change in the importance of the content of the speech. The variable rate of speech outputs can be used to select a translation that has a best fit with the spoken phrase. In various embodiments, the variable rate of speech can supplement or replace the compression or stretching performed by the speech output mechanism.

The multi-lingual translation system includes a phrase-spotting mechanism, a translation mechanism, a speech output mechanism and optionally, a language understanding mechanism or an event measuring mechanism or both. The phrase-spotting mechanism identifies a spoken phrase from a restricted domain of phrases. The language understanding mechanism, if present, maps the identified phrase onto a small set of formal phrases. The translation mechanism maps the formal phrase onto a well-formed phrase in one or more target languages. The speech output mechanism produces high-quality output speech. The speech output may be time synchronized to the spoken phrase using the output of the event measuring mechanism.

The event-measuring mechanism, if present, measures the duration of various key events in the source phrase. For example, the speech can be normalized in duration using event duration information and presented to the user. Event duration could be, for example, the overall duration of the input phrase, the duration of the phrase with interword silences omitted, or some other relevant durational features.

In a template-based translation embodiment, the translation mechanism maps the static components of each phrase over directly to the speech output mechanism, but the variable component, such as a number or date, is converted by the translation mechanism to the target language using a variable mapping mechanism. The variable mapping mechanism may be implemented, for example, using a finite state transducer. The speech output mechanism employs a speech synthesis technique, such as phrase-splicing, to generate high quality output speech from the static phrases with embedded variables. It is noted that the phrase splicing mechanism is inherently capable of modifying durations of the output speech allowing for accurate synchronization.

In a phrase-based translation embodiment, the output of the phrase spotting mechanism is presented to a language understanding mechanism that maps the input sentence onto a relatively small number of output sentences of a variable form as in the template-based translation described above. Thereafter, translation and speech output generation may be performed in a similar manner to the template-based translation.

A more complete understanding of the present invention, as well as further features and advantages of the present invention, will be obtained by reference to the following detailed description and drawings.

DETAILED DESCRIPTION OF PREFERRED EMBODIMENTS

Figure 1:
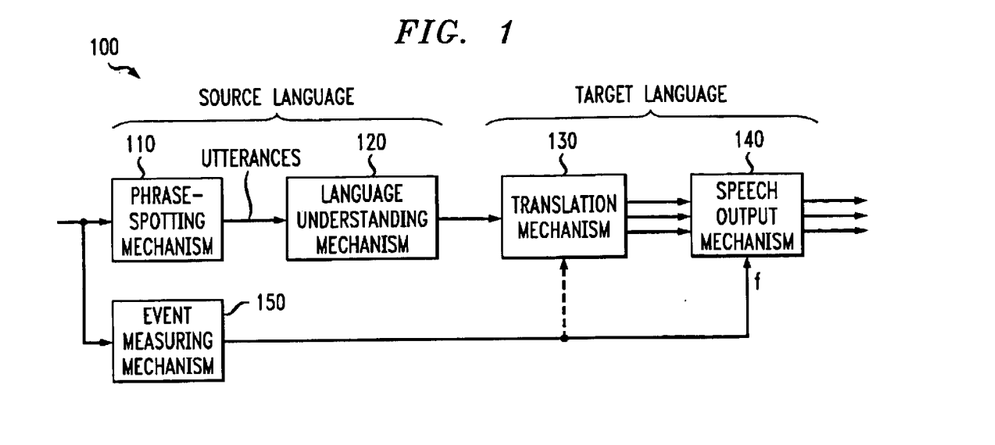
FIG. 1 is a schematic block diagram of a multi-lingual time-synchronized translation system in accordance with the present invention.

FIG. 1 is a schematic block diagram of a multi-lingual time-synchronized translation system 100 in accordance with the present invention. The present invention is directed to a method and apparatus for providing automatic time-synchronized spoken translations of spoken phrases. As used herein, the term time-synchronized means the duration of the translated phrase is approximately the same as the duration of the original message. Generally, it is an object of the present invention to provide high-quality time-synchronized spoken translations of spoken phrases. In other words, the spoken output should have a natural voice quality and the translation should be easily understandable by a native speaker of the language. The present invention recognizes the quality improvements can be achieved by restricting the task domain under consideration. This considerably simplifies the recognition, translation and synthesis problems to the point where near perfect accuracy can be obtained.

As shown in FIG. 1, the multi-lingual time-synchronized translation system 100 includes a phrase-spotting mechanism 110, a language understanding mechanism 120, a translation mechanism 130, a speech output mechanism 140 and an event measuring mechanism 150. The multi-lingual time-synchronized translation system 100 will be discussed hereinafter with three illustrative embodiments, of varying complexity. While the general block diagram shown in FIG. 1 applies to each of the three various embodiments, the various components within the multi-lingual time-synchronized translation system 100 may change in accordance with the complexity of the specific embodiment, as discussed below.

Generally, the phrase-spotting mechanism 110 identifies a spoken phrase from a restricted domain of phrases. The phrase-spotting mechanism 110 may achieve higher accuracy by restricting the task domain. The language understanding mechanism 120 maps the identified phrase onto a small set of formal phrases. The translation mechanism 130 maps the formal phrase onto a well-formed phrase in one or more target languages. The speech output mechanism 140 produces high-quality output speech using the output of the event measuring mechanism 150 for time synchronization. The event-measuring mechanism 150, discussed further below in conjunction with FIG. 8, measures the duration of various key events in the source phrase. The output of the event-measuring mechanism 150 can be applied to the speech output mechanism 140 or the translation mechanism 130 or both. The event-measuring mechanism 150 can provide a message to the translation mechanism 130 to select a longer or shorter version of a translation for a given word or phrase. Likewise, the event-measuring mechanism 150 can provide a message to the speech output mechanism 140 to compress or stretch the translation for a given word or phrase, in a manner discussed below.

Table-Based Translation

Figure 2:
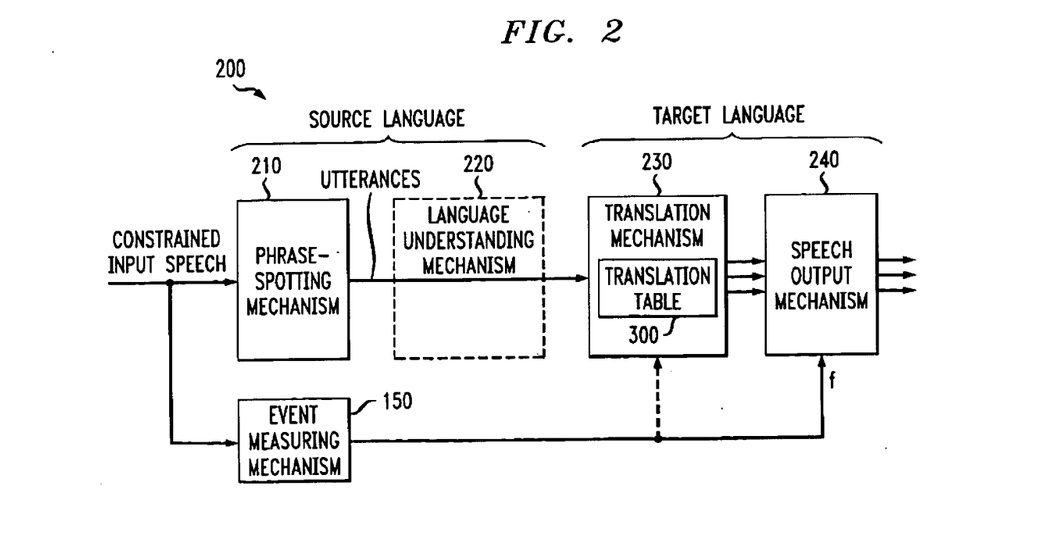
FIG. 2 is a schematic block diagram of a table-based embodiment of a multi-lingual time-synchronized translation system in accordance with the present invention.

In a table-based translation embodiment, shown in FIG. 2, the phrase spotting mechanism 210 can be a speech recognition system that decides between a fixed inventory of preset phrases for each utterance. Thus, the phrase-spotting mechanism 210 may be embodied, for example, as the IBM ViaVoice Millenium Edition™ (1999), commercially available from IBM Corporation, as modified herein to provide the features and functions of the present invention.

Figure 3:
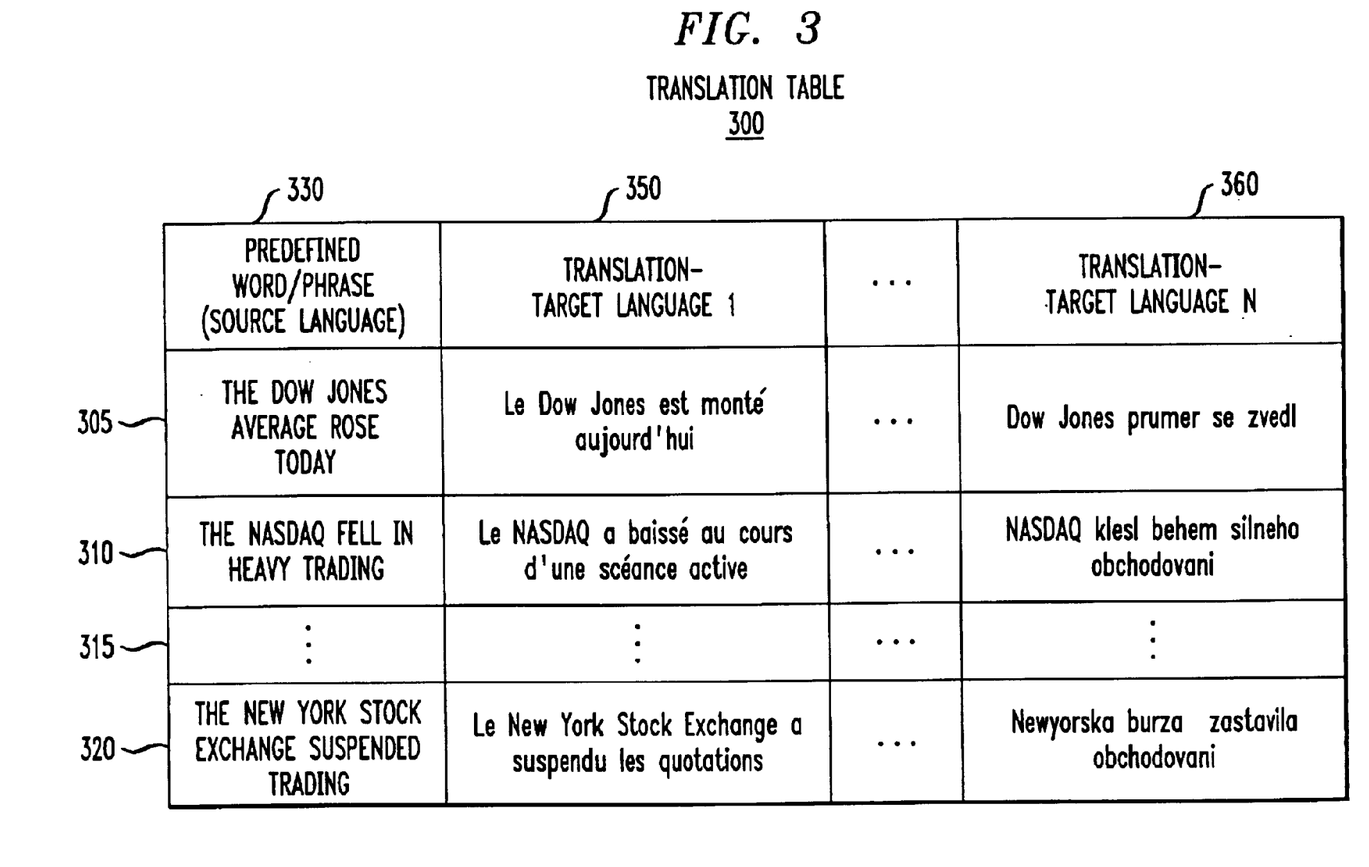
FIG. 3 is a sample table from the translation table of FIG. 2.

In the table-based translation embodiment, there is no formal language understanding mechanism 220, and the translation mechanism 230 is a table-based lookup process. In other words, the speaker is restricted to a predefined canonical set of words or phrases and the utterances will have a predefined format. The constrained utterances are directly passed along by the language understanding mechanism 220 to the translation mechanism 230. The translation mechanism 230 contains a translation table 300 containing an entry for each recognized word or phrase in the canonical set of words or phrases. The speech output mechanism 240 contains a prerecorded speech table (not shown) consisting of prerecorded speech for each possible source phrase in the translation table 300. The prerecorded speech table may contain a pointer to an audio file for each recognized word or phrase.

As discussed further below in conjunction with FIG. 8, the speech is normalized in duration using event duration information produced by the event duration measurement mechanism 250, and presented to the user. Event duration could be the overall duration of the input phrase, the duration of the phrase with interword silences omitted, or some other relevant durational features.

As previously indicated, the translation table 300, shown in FIG. 3, preferably contains an entry for each word or phrase in the canonical set of words or phrases. The translation table 300 translates each recognized word or phrase into one or more target languages. As shown in FIG. 3, the translation table 300 maintains a plurality of records, such as records 305–320, each associated with a different recognized word or phrase. For each recognized word or phrase identified in field 330, the translation table 300 includes a corresponding translation into each desired target language in fields 350 through 360.

In an alternate implementation of the translation table 300, the present invention provides multiple output sentences for a given word or phrase. In this embodiment, each output sentence for a given word or phrase reflects a different emotional emphasis and could be selected automatically, or manually as desired, to create a specific emotional effect. For example, the same output sentence for a given word or phrase can be recorded three times, to selectively reflect excitement, sadness or fear. In further variations, the same output sentence for a given word or phrase can be recorded to reflect different accents, dialects, pitch, loudness or rates of speech. Changes in the volume or pitch of speech can be utilized, for example, to indicate a change in the importance of the content of the speech. The variable rate of speech outputs can be used to select a translation that has a best fit with the spoken phrase. In various embodiments, the variable rate of speech can supplement or replace the compression or stretching performed by the speech output mechanism. In yet another variation, time adjustments can be achieved by leaving out less important words in a translation, or inserting fill words (in addition to, or as an alternative to, compression or stretching performed by the speech output mechanism).

Template-Based Translation

Figure 4:
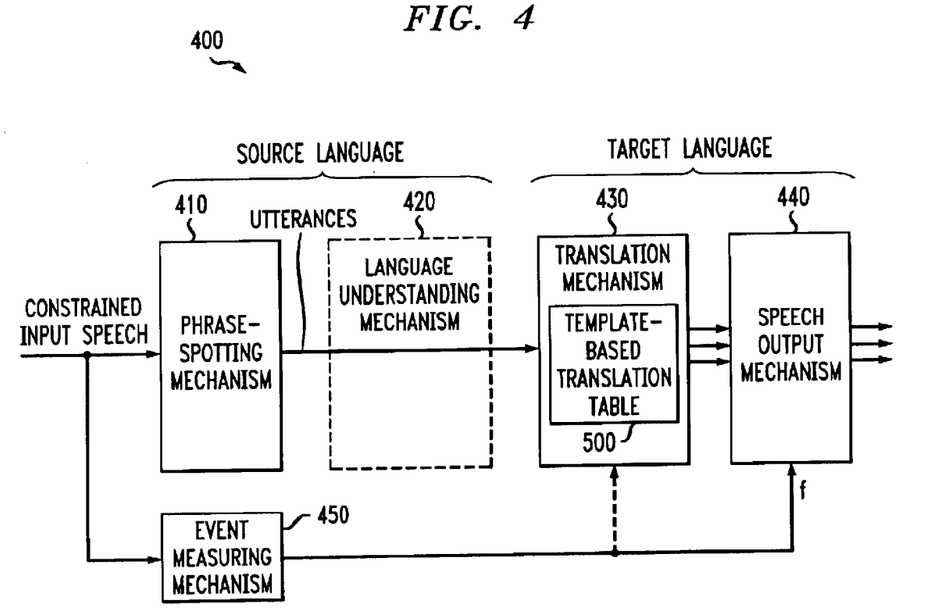
FIG. 4 is a schematic block diagram of a template-based embodiment of a multi-lingual time-synchronized translation system in accordance with the present invention.

In a template-based translation embodiment, shown in FIG. 4, the phrase spotting mechanism 410 can be a grammar-based speech recognition system capable of recognizing phrases with embedded variable phrases, such as names, dates or prices. Thus, there are variable fields on the input and output of the translation mechanism. Thus, the phrase-spotting mechanism 410 may be embodied, for example, as the IBM ViaVoice Millenium Edition™ (1999), commercially available from IBM Corporation, as modified herein to provide the features and functions of the present invention.

Figure 5:
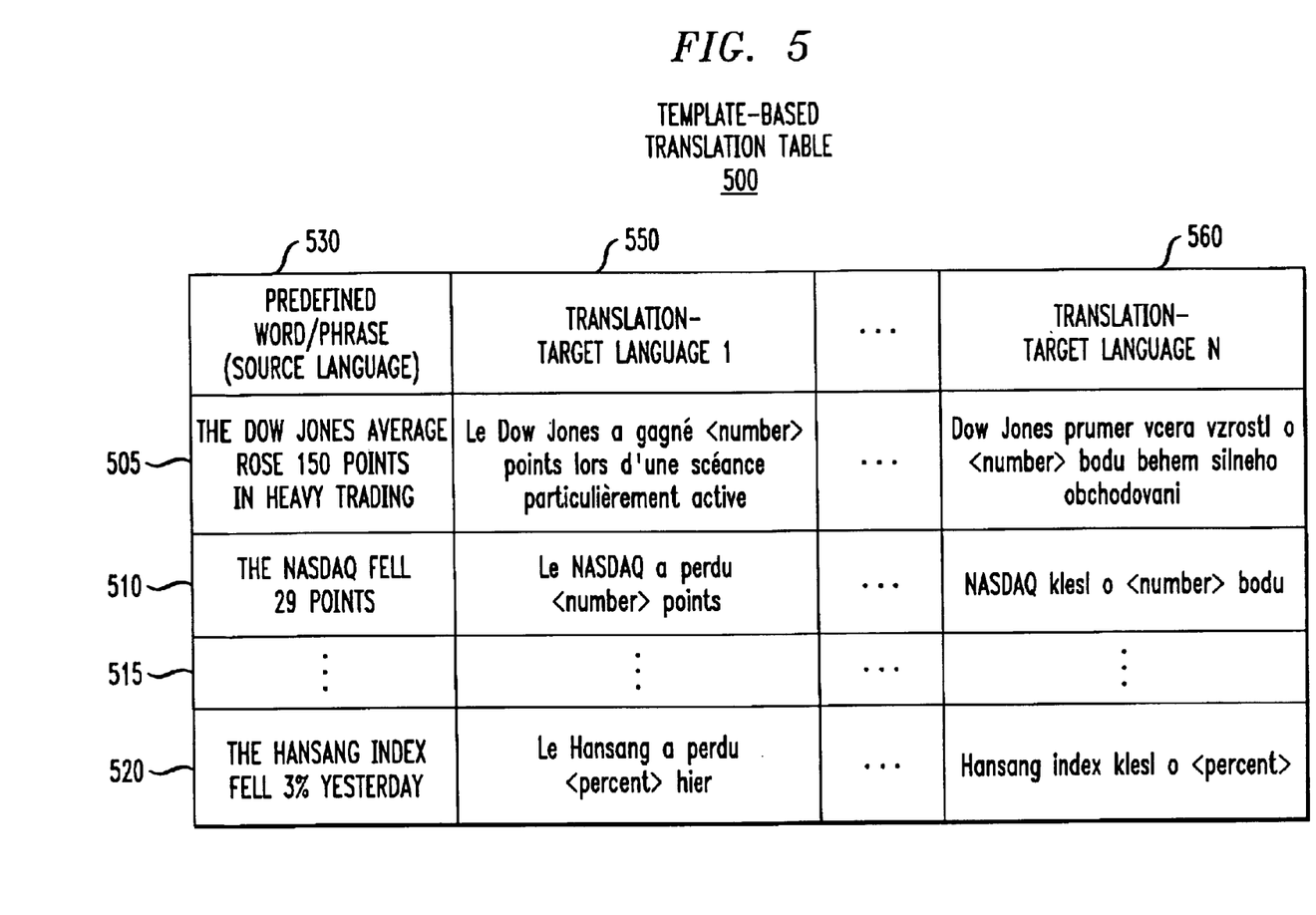
FIG. 5 is a sample table from the template-based translation table of FIG. 4.

In the template-based translation embodiment, there is again no formal language understanding mechanism 420, and the speaker is restricted to a predefined canonical set of words or phrases. Thus, the utterances produced by the phrase-spotting mechanism 410 will have a predefined format. The constrained utterances are directly passed along by the language understanding mechanism 420 to the translation mechanism 430. The translation mechanism 430 is somewhat more sophisticated than the table-based translation embodiment discussed above. The translation mechanism 430 contains a translation table 500 containing an entry for each recognized word or phrase in the canonical set of words or phrases. The translation mechanism 430 maps the static components of each phrase over directly to the speech output mechanism 440, but the variable component, such as a number or date, is converted by the translation mechanism 430 to the target language using a variable mapping mechanism.

The variable mapping mechanism may be implemented, for example, using a finite state transducer. For a description of finite state transducers see, for example, Finite State Language Processing, E. Roche and Y. Schabes, eds. MIT Press 1997, incorporated by reference herein. The translation mechanism 430 contains a template-based translation table 500 containing an entry for each recognized phrase in the canonical set of words or phrases, but having a template or code indicating the variable components. In this manner, entries with variable components contain variable fields.

The speech output mechanism 440 employs a more sophisticated high quality speech synthesis technique, such as phrase-splicing, to generate high quality output speech, since there are no longer static phrases but static phrases with embedded variables. It is noted that the phrase splicing mechanism is inherently capable of modifying durations of the output speech allowing for accurate synchronization. For a discussion of phrase-splicing techniques, see, for example, R. E. Donovan, M. Franz, J. Sorensen, and S. Roukos (1998) "Phrase Splicing and Variable Substitution Using the IBM Trainable Speech Synthesis System" ICSLP 1998, Australia, incorporated by reference herein.

As previously indicated, the template-based translation table 500, shown in FIG. 5, preferably contains an entry for each word or phrase in the canonical set of words or phrases. The template-based translation table 500 translates the static components of each recognized word or phrase into one or more target languages and contains an embedded variable for the dynamic components. As shown in FIG. 5, the template-based translation table 500 maintains a plurality of records, such as records 505–520, each associated with a different recognized word or phrase. For each recognized word or phrase identified in field 530, the template-based translation table 500 includes a corresponding translation of the static component, with an embedded variable for the dynamic component, into each desired target language in fields 550 through 560.

Thus, the broadcaster may say, "The Dow Jones average rose 150 points in heavy trading" and the recognition algorithm understands that this is an example of the template "The Dow Jones average rose <number> points in heavy trading". The speech recognition algorithm will transmit the number of the template (1 in this example) and the value of the variable (150). On the output side, the phrase-splicing or other speech synthesizer inserts the value of the variable into the template and produces, for example "Le Dow Jones a gagné 150 points lors d'une scéance particulièrement active."

Phrase-Based Translation

Figure 6:
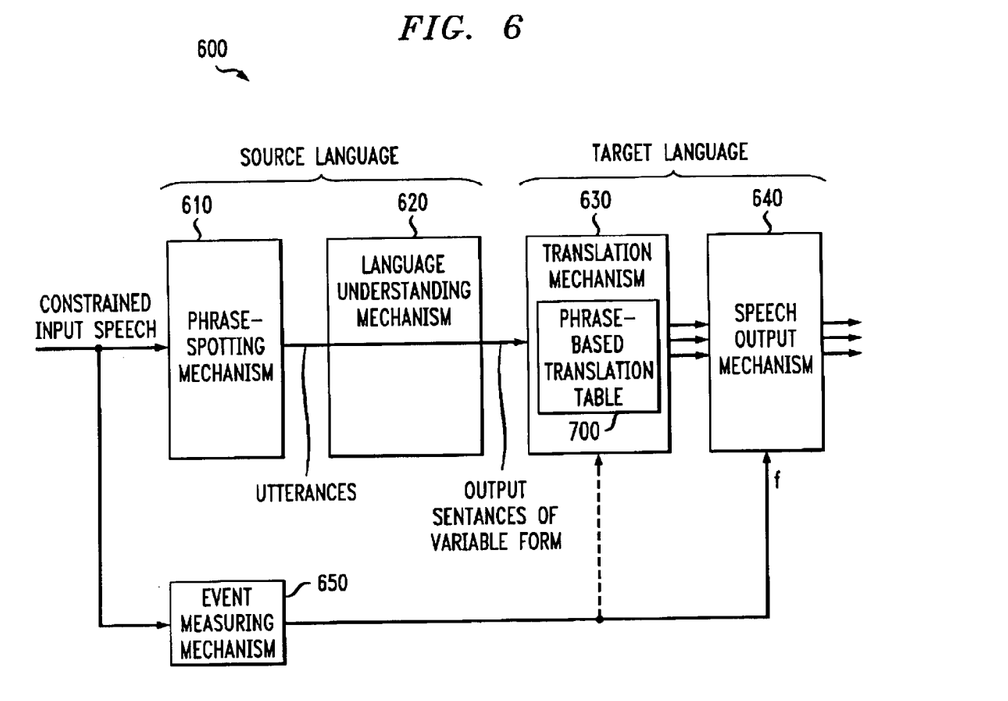
FIG. 6 is a schematic block diagram of a phrase-based embodiment of a multi-lingual time-synchronized translation system in accordance with the present invention.

In a phrase-based translation embodiment, shown in FIG. 6, the phrase spotting mechanism 610 is now a limited domain speech recognition system with an underying statistical language model. Thus, in the phrase-based translation embodiment, the phrase-spotting mechanism 610 may be embodied, for example, as the IBM ViaVoice Millenium Edition™ (1999), commercially available from IBM Corporation, as modified herein to provide the features and functions of the present invention. The phrase-based translation embodiment permits more flexibility on the input speech than the template-based translation embodiment discussed above.

Figure 7:
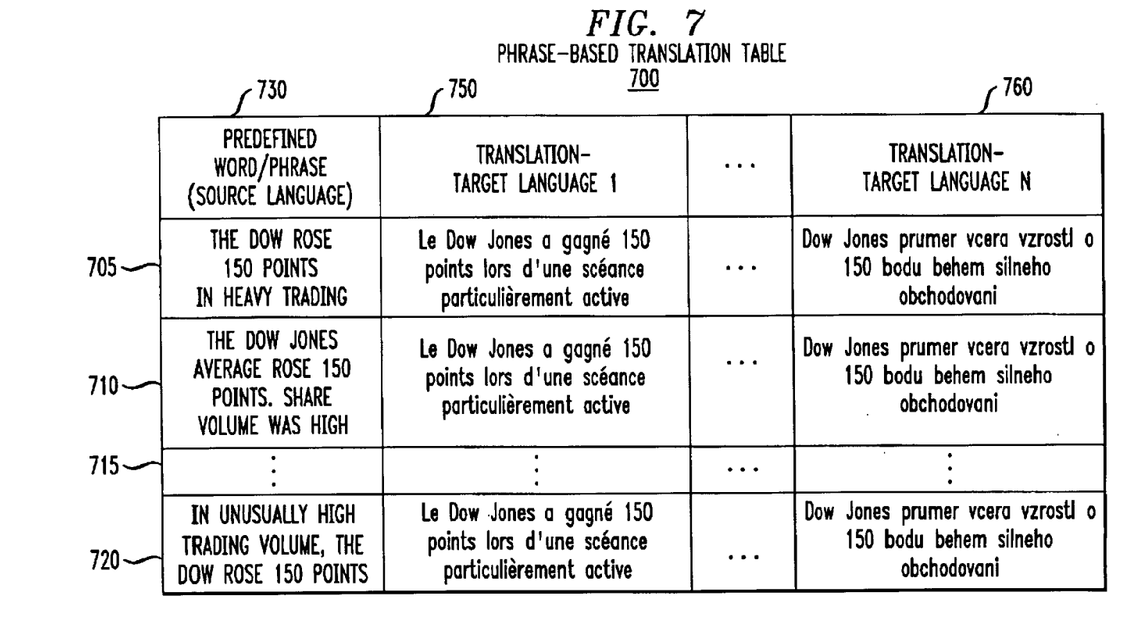
FIG. 7 is a sample table from the phrase-based translation table of FIG. 6.

The output of the phrase spotting mechanism 610 is presented to a language understanding mechanism 620 that maps the input sentence onto a relatively small number of output sentences of a variable form as in the template-based translation described above. For a discussion of feature-based mapping techniques, see, for example, K. Papineni, S. Roukos and T. Ward "Feature Based Language Understanding," Proc. Eurospeech '97, incorporated by reference herein. Once the language understanding mechanism 620 has performed the mapping, the rest of the process for translation and speech output generation is the same as described above for template-based translation. The translation mechanism 630 contains a translation table 700 containing an entry for each recognized word or phrase in the canonical set of words or phrases. The translation mechanism 630 maps each phrase over to the speech output mechanism 640.

The speech output mechanism 640 employs a speech synthesis technique to translate the text in the phrase-based translation table 700 into speech.

As previously indicated, the phrase-based translation table 700, shown in FIG. 7, preferably contains an entry for each word or phrase in the canonical set of words or phrases. The phrase-based translation table 700 translates each recognized word or phrase into one or more target languages. As shown in FIG. 7, the phrae-based translation table 700 maintains a plurality of records, such as records 705–720, each associated with a different recognized word or phrase. For each recognized word or phrase identified in field 730, the phrase-based translation table 700 includes a corresponding translation into each desired target language in fields 750 through 760.

Thus, the recognition algorithm transcribes the spoken sentence, a natural-language-understanding algorithm determines the semantically closest template, and transmits only the template number and the value(s) of any variable(s). Thus the broadcaster may say "In unusually high trading volume, the Dow rose 150 points" but because there is no exactly matching template, the NLU algorithm picks "The Dow rose 150 points in heavy trading."

Figure 8:
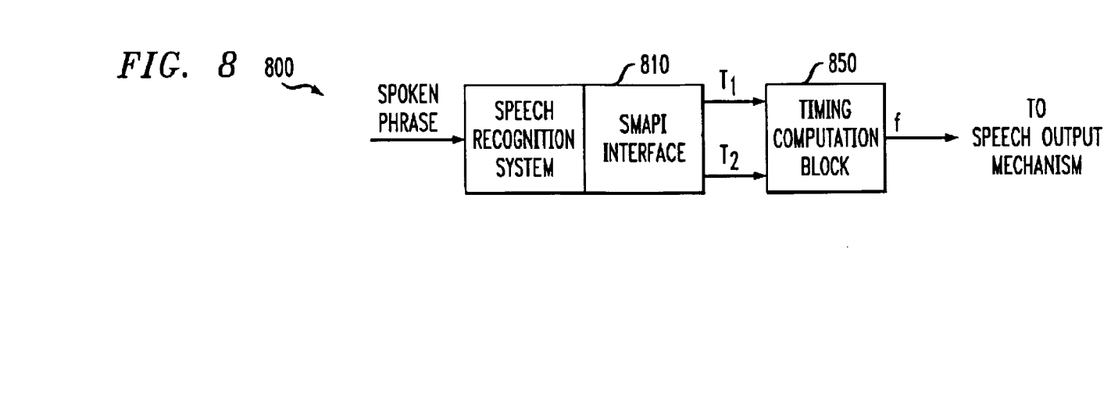
FIG. 8 is a schematic block diagram of the event measuring mechanism of FIG. 1, 2, 4 or 6.

FIG. 8 is a schematic block diagram of the event measuring mechanism 150, 250, 450 and 650 of FIGS. 1, 2, 4 and 6, respectively. As shown in FIG. 8, the illustrative event measuring mechanism 150 may be implemented using a speech recognition system that provides the start and end times of words and phrases. Thus, the event measuring mechanism 150 may be embodied, for example, as the IBM ViaVoice Millenium Edition™ (1999), commercially available from IBM Corporation, as modified herein to provide the features and functions of the present invention. The start and end times of words and phrases may be obtained from the IBM ViaVoice™ speech recognition system, for example, using the SMAPI application programming interface.

Thus, the exemplary event measuring mechanism 150 has an SMAPI interface 810 that extracts the starting time for the first words of a phrase, $T_1$, and the ending time for the last word of a phrase, $T_2$. In further variations, the duration of individual words, sounds, or intra-word or utterance silences may be measured in addition to, or instead of, the overall duration of the phrase. The SMAPI interface 810 transmits the starting and ending time for the phrase, $T_1$ and $T_2$, to a timing computation block 850 that performs computations to determine at what time and at what speed to play back the target phrase. Generally, the timing computation block 850 seeks to time compress phrases that are longer (for example, by removing silence periods or speeding up the playback) and lengthen phrases that are too short (for example, by padding with silence or slowing down the playback).

If time-synchronization in accordance with one aspect of the present invention is not desired, then the timing computation block 850 can ignore $T_1$ and $T_2$. Thus, the timing computation block 850 will instruct the speech output mechanism 140 to simply start the playback of the target phrase as soon as it receives the phrase from the translation mechanism 130, and to playback of the target phrase at a normal rate of speed.

If speed normalization is desired, the timing computation block 850 can calculate the duration, $D_S$, of the source phrase as the difference $D_S=T_2.-T_1$. The timing computation block 850 can then determine the normal duration, $D_T$, of the target phrase, and will then apply a speedup factor, f, equal to $D_T/D_S$. Thus, if the original phrase lasted two (2) seconds, but the translated target phrase would last 2.2 seconds at its normal speed, the speedup factor will be 1.1, so that in each second the system plays 1.1 seconds worth of speech.

It is noted that speedup factors in excess of 1.1 or 1.2 tend to sound unnatural. Thus, it may be necessary to limit the speedup. In other words, the translated text may temporarily fall behind schedule. The timing computation algorithm can then reduce silences and accelerate succeeding phrases to catch up.

In a further variation the duration of the input phrases or the output phrases, or both, can be adjusted in accordance with the present invention. It is noted that it is generally more desirable to stretch the duration of a phrase than to shorten the duration. Thus, the present invention provides a mechanism for selectively adjusting either the source language phrase or the target language phrase. Thus, according to an alternate embodiment, for each utterance, the timing computation block 850 determines whether the source language phrase or the target language phrase has the shorter duration, and then increases the duration of the phrase with the shorter duration.

The speech may be normalized, for example, in accordance with the teachings described in S. Roucos and A. Wilgus, "High Quality Time Scale Modifiction for Speech," ICASSP '85, 493–96 (1985), incorporated by reference herein.

It is to be understood that the embodiments and variations shown and described herein are merely illustrative of the principles of this invention and that various modifications may be implemented by those skilled in the art without departing from the scope and spirit of the invention.

What is claimed is:

1. A system for translating a source language into at least one of a plurality of target languages, comprising:
   a phrase-spotting system for identifying a spoken phrase from a restricted domain of phrases;
   a plurality of prerecorded translations in a plurality of target languages, wherein each of said prerecorded translations corresponds to one of said plurality of target languages; and wherein each of said prerecorded translations corresponds to a different speech characteristic; and
   a playback mechanism for reproducing said spoken phrase in said at least one of a plurality of target languages.

2. The system of claim 1, wherein each of said prerecorded translations corresponds to a varying degree of emphasis.

3. The system of claim 2, wherein said varying degree of emphasis corresponds to a variable loudness.

4. The system of claim 2, wherein said varying degree of emphasis corresponds to a variable pitch.

5. The system of claim 2, wherein said varying degree of emphasis corresponds to a variable manner of speaking.

6. The system of claim 1, wherein each of said prerecorded translations corresponds to a varying degree of emotion.

7. The system of claim 1, wherein each of said prerecorded translations corresponds to a different dialect.

8. The system of claim 1, wherein each of said prerecorded translations corresponds to a different loudness.

9. The system of claim 1, wherein each of said prerecorded translations corresponds to a different speed of speech.

10. The system of claim 1, wherein each of said prerecorded translations corresponds to a different accent.

11. The system of claim 1, further comprising a mechanism for manual selection of one of said prerecorded translations.

12. A method for translating a source language into at least one of a plurality of target languages, comprising:
   providing a plurality of prerecorded translations in a plurality of target languages, wherein each of said prerecorded translations corresponds to one of said plurality of target languages; and wherein each of said prerecorded translations corresponds to a different speech characteristic;
   identifying a spoken phrase from a restricted domain of phrases; and
   reproducing said spoken phrase in said at least one of a plurality of target languages.

13. The method of claim 12, wherein each of said prerecorded translations corresponds to a varying degree of emphasis.

14. The method of claim 13, wherein said varying degree of emphasis corresponds to a variable loudness.

15. The method of claim 13, wherein said varying degree of emphasis corresponds to a variable pitch.

16. The method of claim 13, wherein said varying degree of emphasis corresponds to a variable manner of speaking.

17. The method of claim 12, wherein each of said prerecorded translations corresponds to a varying degree of emotion.

18. The method of claim 12, wherein each of said prerecorded translations corresponds to a different dialect.

19. The method of claim 12, wherein each of said prerecorded translations corresponds to a different loudness.

20. The method of claim 12, wherein each of said prerecorded translations corresponds to a different speed of speech.

21. The method of claim 12, wherein each of said prerecorded translations corresponds to a different accent.

22. The method of claim 12, further comprising the step of receiving a manual selection of one of said prerecorded translations.

23. A system for translating a source language into at least one of a plurality of target languages, comprising:

a memory that stores computer-readable code; and a processor operatively coupled to said memory, said processor configured to implement said computer-readable code, said computer-readable code configured to:

provide a plurality of prerecorded translations in a plurality of target languages, wherein each of said prerecorded translations corresponds to one of said plurality of target languages; and wherein each of said prerecorded translations corresponds to a different speech characteristic;

identify a spoken phrase from a restricted domain of phrases; and reproduce said spoken phrase in said at least one of a plurality of target languages.

24. An article of manufacture, comprising:

a computer readable medium having computer readable code means embodied thereon, said computer readable program code means comprising:

a step to provide a plurality of prerecorded translations in a plurality of target languages, wherein each of said prerecorded translations corresponds to one of said plurality of target languages; and wherein each of said prerecorded translations corresponds to a different speech characteristic;

a step to identify a spoken phrase from a restricted domain of phrases; and a step to reproduce said spoken phrase in said at least one of a plurality of target languages.

25. A method for translating a source language into at least one of a plurality of target languages, comprising:

providing a plurality of prerecorded translations, wherein each of said prerecorded translations corresponds to a different speech characteristic;

identifying a spoken phrase from a restricted domain of phrases; and reproducing said spoken phrase in said at least one of a plurality of target languages.

26. The method of claim 25, wherein each of said prerecorded translations corresponds to a varying degree of emphasis.

27. The method of claim 26, wherein said varying degree of emphasis corresponds to a variable loudness.

28. The method of claim 26, wherein said varying degree of emphasis corresponds to a variable pitch.

29. The method of claim 26, wherein said varying degree of emphasis corresponds to a variable manner of speaking.

30. The method of claim 25, wherein each of said prerecorded translations corresponds to a varying degree of emotion.

31. The method of claim 25, wherein each of said prerecorded translations corresponds to a different dialect.

32. The method of claim 25, wherein each of said prerecorded translations corresponds to a different loudness.

33. The method of claim 25, wherein each of said prerecorded translations corresponds to a different speed of speech.

34. The method of claim 25, wherein each of said prerecorded translations corresponds to a different accent.

35. The method of claim 25, further comprising the step of receiving a manual selection of one of said prerecorded translations.

* * * * *